DAVID M. TENNISWOOD
INVENTOR.

BY John R. Faulkner
Clifford L. Sadler
ATTORNEYS

United States Patent Office 3,488,959
Patented Jan. 13, 1970

3,488,959
DUAL MASTER CYLINDER
David M. Tenniswood, Detroit, Mich., assignor to Ford Motor Company, Dearborn, Mich., a corporation of Delaware
Filed Oct. 17, 1967, Ser. No. 675,939
Int. Cl. F15b 7/08
U.S. Cl. 60—54.6                                                      9 Claims

ABSTRACT OF THE DISCLOSURE

A dual master cylinder for a split hydraulic braking system which upon failure of a portion of the split system limits displacement loss in the remaining portion so that the resulting increase in pedal travel is nominal. A dual master cylinder having a balancing means between primary and secondary chambers permitting limited relative movement of the pistons.

Background of the invention

In an automotive hydraulic braking system utilizing a conventional single piston master cylinder, a break or leak anywhere in the system may result in complete loss of braking ability. A known method of preventing such a loss of braking ability is to use a master cylinder having two pressure chambers and operating part of the individual wheel cylinders from one of the chambers and other wheel cylinders from a second chamber. The use of such a split system with a dual master cylinder gives rise to design complications not experienced with single pressure chamber systems. A method to effect substantially simultaneous actuation of the various wheel cylinders in any brake system is considered desirable. Because maximum braking is generally achieved with greater displacement to the front wheel cylinders than to the rear wheel cylinders, a means to apportion displacement between the front and rear wheel brakes is also desirable. Finally, with a split system it is desirable to have a construction that satisfactorily performs these operations without a significant loss of displacement or increase in pedal travel in the event that a hydraulic failure occurs in one of the wheel cylinder lines.

The prior art is replete with dual master cylinder devices that perform only some of the aforementioned functions or that utilize a construction which is intricate and not capable of economical mass production or continued reliable operation. It is, therefore, an object of this invention to provide an economical and reliable dual master cylinder construction for a split hydraulic braking system that has a balancing means between the individual portions of the split system to effect substantially simultaneous actuation of the individual wheel cylinders, that has an apportioning means to provide a greater displacement to one portion of the split system than to the other, and which experiences only a nominal amount of displacement loss and pedal travel increase upon a hydraulic line failure.

Brief summary of the invention

A dual master cylinder constructed in accordance with this invention includes a first pressure chamber having a cylindrical bore and a second pressure chamber having a relatively larger diameter cylindrical bore. A piston is slidably received within the first chamber bore. Another piston is similarly slidably received within the second chamber bore. One of the pistons is formed with an axially extending stem portion while the other piston is formed with an axial recess which receives the stem portion. A spring means is positioned along the stem portion and caged within the axial recess to bias the pistons into an axially normal relative position, but which permits movement of one piston relative to the other in both axial directions from the normal position to substantially balance the pressures in the first chamber and the second chamber.

Detailed description of the invention

Figure 1:
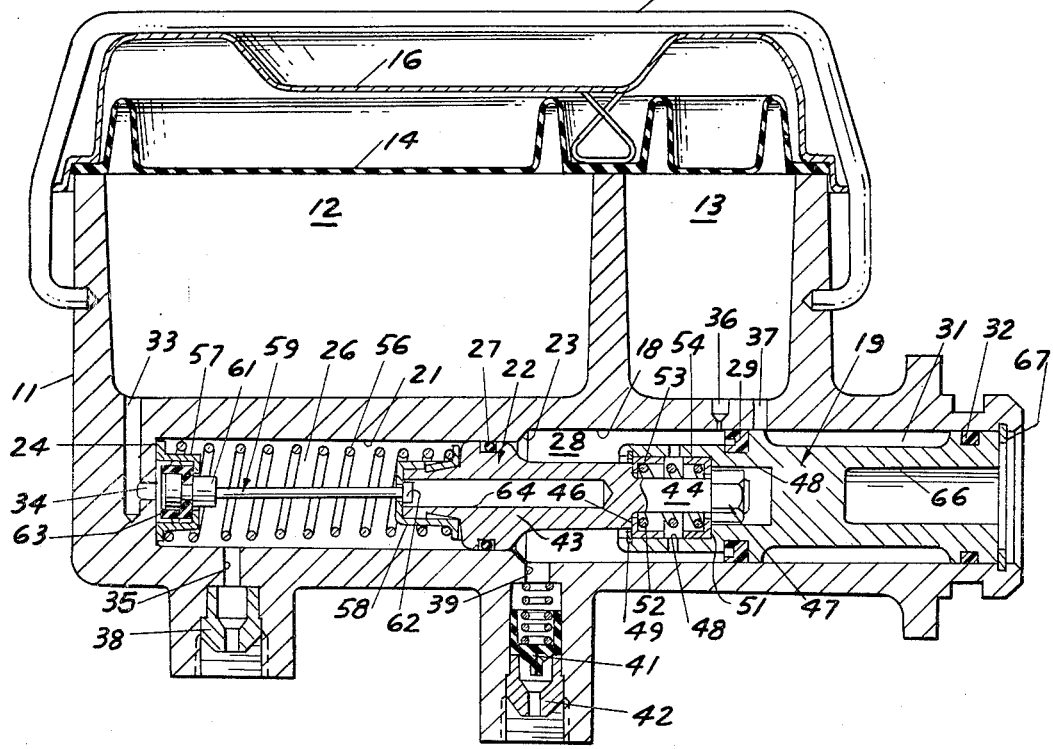
FIGURE 1 is an elevational view in section of a split hydraulic master cylinder at a time when the vehicle brakes are not applied which incorporates a preferred embodiment of the invention.

Referring now to the drawings for a more complete understanding of the present invention, FIGURE 1 discloses a dual master cylinder for a split hydraulic brake system. The dual master cylinder of FIGURE 1 comprises a housing 11 having an upper portion that is divided into front and rear reservoir chambers 12 and 13. The open upper ends of the reservoir chambers 12 and 13 are sealed by a flexible rubber diaphragm 14 that has a plurality of corrugations to enhance its flexibility. A cover or lid 16 is positioned over the diaphragm 14 and is sealed along the edges of the reservoirs 12 and 13 by a retainer 17 which holds the perimeter of the cover 16 against diaphragm 14 at the upper end of the master cylinder housing 11.

The housing 11 has a horizontally extending bore 18 slidably receiving piston 19. A smaller diameter bore 21, coaxial with bore 18, slidably receives piston 22. Bore 18 is open at its right end, as shown in FIGURE 1, and adjoins bore 21 at conical surface 23 at its other end. Bore 21 terminates within housing 11 at end 24.

Piston 22 includes O-ring seal 27 which directly engages bore 21. Piston 19 includes fluid seal 32, positioned near its right end, and high pressure seal 29, axially spaced apart from seal 32 toward the inner end of piston 19. The front or primary chamber 26 is defined by a portion of bore 21, end 24 and O-ring seal 27. Similarly, the rear or secondary chamber 28 is defined by a portion of bores 18 and 21, conical surface 23 and seals 27 and 29. Annular lubrication chamber 31, formed within the right-hand portion of piston 19, is defined by seals 29 and 32 and bore 18.

Brake fluid reservoir 12 communicates with primary chamber 26 through passage 33 and compensation orifice 34. Likewise, fluid reservoir 13 communicates with secondary chamber 28 through compensation port 36. Port 37 permits fluid leaking past seal 29 into chamber 31 to flow back to reservoir 13.

Outlet port 35 transmits fluid from primary chamber 26 through fitting 38 to the primary or front wheel hydraulic lines and the corresponding wheel cylinders (not shown).

Outlet port 39 transmits fluid from secondary chamber 28 through residual pressure valve 41 and pipe fitting 42 to the secondary or rear wheel hydraulic lines and their corresponding wheel cylinders (not shown).

Smaller diameter, primary piston 22 is formed with a main body portion 43, an axially extending threaded stem portion 44, and a shoulder portion 46 intermediate the main body portion 43 and the stem portion 44. A lock nut 47 is threadedly received about the end of stem portion 44.

Larger diameter, secondary piston 19 is formed with stepped axial recess 48 that receives stem portion 44 and the nut 47. Snap ring 49 and shoulder 51 form abutments within axial recess 48. Lock nut 47 is positioned on stem portion 44 so that the axial distance between shoulder 46 and nut 47 of piston 22 is equal to the axial distance between the snap ring 49 and shoulder 51 of piston 19.

Compressed coil spring 52 biases pistons 19 and 22 into a normal relative position. It is received within axial recess 48 and about stem portion 44 and between abutments 46 and 47, and 49 and 51. The end portions of spring 52 are received within cup-shaped washers 53 and 54. The combined axial lengths of cup-shaped washers 53 and 54 are about two thirds the axial length between shoulder 46 and nut 47 or between snap ring 49 and shoulder 51.

Piston return spring 56 extends axially within bore 21 between end 24 and piston 22 and urges piston 19 into normal contact with snap ring 67, positioned in an annular groove at the right-hand end of bore 18. Hat-shaped guide 57 centers one end of spring 56 in bore 21 and abuts end 24. A second hat-shaped guide 58 centers the other end of spring 56 and grips a portion of piston 22.

A valve means is provided to seal the compensating port 34 during a compression stroke of the piston 22. Plunger valve 59 extends axially within the bore 21 and is centered by guides 57 and 58. Valve head 61 and seal 63 are normally prevented from abutting end 24 and sealing port 34 by guide 58 which abuts cap 62 of plunger valve 59. Cup-shaped seal 63 is secured to valve head 61 and is axially spaced apart from inlet port 34 when the vehicle brakes are not applied. A blind bore 64 in piston 22 extending toward stem portion 44 slidably receives cap 62 of plunger valve 59 and permits leftward displacement of piston 22 relative to plunger valve 59.

A blind bore 66 is formed in the right end of piston 19 to receive the push rod (not shown) of the master cylinder actuating mechanism. The push rod is connected to the brake pedal (not shown) at one end and is inserted in bore 66 at its other end.

Operation

FIGURE 1 illustrates the normal positions of the elements of the dual master cylinder at a time when the vehicle brakes are not applied. Piston 19 is held in an extreme right-hand position against snap ring 67 by coil spring 56 acting through piston 22 and spring 52. Piston 22 is, in turn, biased into a normal position relative to piston 19 by the force of caged spring 52. The left edge of high pressure seal 29 is positioned slightly to the right of compensating port 36. Cup seal 63 of plunger valve 59 is axially spaced apart from orifice 34. With the elements in the positions described fluid from reservoir 12 fills chamber 26 and fluid from reservoir 13 fills chambers 28 and 31.

The cross sectional areas of bores 18 and 21 are determined according to the volume requirements of the primary and secondary portions of the split hydraulic system. It has been found that for maximum braking ability the front wheels should receive a greater amount of displacement than the rear wheels. Assuming that the vehicle design requires 65 percent of the total brake system fluid displacement volume to the front wheels or the primary portions of the split system, the correct volume displacement would be obtained by proportioning the primary bore 21 cross sectional area so that it is equal to 65 percent of the cross sectional area of secondary bore 18. If the displacement volume requirements of the primary portion were exactly 65 percent of the total brake system displacement volume requirements and if the cross sectional area of primary bore 18 was exactly 65 percent of the cross sectional area of secondary bore 21, pistons 19 and 22 would move simultaneously to the left with no movement relative to each other. It is extremely unlikely, however, because of normal manufacturing tolerances that the volume requirements of the individual portions of the split system will be exactly equal to the respective displacement volumes of the pressure chambers of the dual master cylinder. To compensate for this, spring 52 permits movement of one of pistons 19 and 21 relative to the other in either axial direction to substantially balance the pressures in chambers 26 and 28 and thereby effect simultaneous actuation of all wheel cylinders. Other than to balance chamber pressures, pistons 19 and 22 move relative to each other only upon the occurrence of a brake line failure.

Because of the essentially simultaneous and equidistant movement of pistons 19 and 22 during normal braking, O-ring seal 27 carries only a nominal or no pressure differential. It is only when there is a brake line failure in one of the hydraulic systems that O-ring seal 27 becomes a high pressure seal, and wear of seal 27 is accordingly reduced. Seal 32 carries reservoir 13 pressure which is at or near atmospheric pressure. Thus, it may be seen that seal 29 of piston 19 is the only high pressure sliding seal during normal operation. This reduces the cost and increases the reliability of the invention embodiment.

On initial movement of pistons 19 and 22 during normal braking operation, seal 29 traverses port 36 to seal chamber 28 from reservoir 13. At the same time, the increased pressure in chamber 26 caused by simultaneous leftward movement of piston 22 urges plunger valve 59 and its seal 63 into sealing engagement with bore end 24. Guide 58 does not at this point limit the leftward movement of plunger valve 59 because guide 58 itself has moved leftwardly with piston 22.

Figure 3:
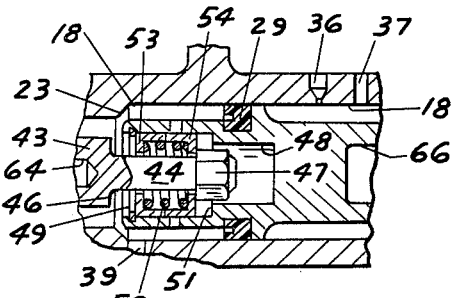
FIGURE 3 is a sectional view of a portion of the master cylinder of FIGURE 1 at a time when the vehicle brakes are applied showing the relative positions of elements during a front or primary portion brake line failure.

Should a hydraulic line failure occur in the primary portion of the split system during braking of the vehicle, the pressure in secondary chamber 28 will overcome the forces of springs 52 and 56 and move piston 22 leftwardly relative to piston 19 until cup washers 53 and 54 come together. Piston 22 is prevented from bottoming against bore end 24 by piston 19 and the consecutive abutting of snap ring 49 of piston 19, cup washers 53 and 54 and nut 47. Thus, the only increase in secondary portion volume requirements necessitated by a primary portion line failure is that required to move cup washer 54 the limited distance from its piston shown in FIGURE 1 to the position shown in FIGURE 3.

Figure 2:
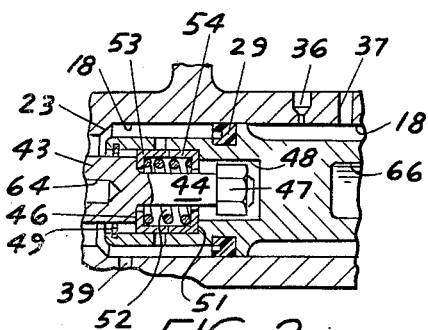
FIGURE 2 is a sectional view of a portion of the master cylinder of FIGURE 1 at a time when the vehicle brakes are applied showing the relative positions of elements during a rear or secondary portion brake line failure.

Should a hydraulic line failure occur in the secondary portion of the split system during braking of the vehicle, the pressure of primary chamber 26 and the push rod force acting upon piston 19 will cause piston 22 to move rightwardly relative to piston 19 until cup washers 53 and 54 are compressed between shoulders 46 and 51 as shown in FIGURE 2. The only increase in pedal travel necessitated by a secondary portion line failure is that required to move cup washer 53 the limited distance from its position shown in FIGURE 1 to the position shown in FIGURE 2.

In summary, it may be seen that this invention provides a dual master cylinder for a split system having a pressure balancing mechanism between the two pressure chambers. Unlike other devices performing apportioning and balancing functions, the loss of displacement in the operative portion of the split brake system and the resulting increase in brake pedal travel occurring upon a failure in one portion of the split system are nominal.

The foregoing description presents the presently preferred embodiment of the invention. Modifications and alterations will occur to those skilled in the art that are included within the scope and spirit of the following claims.

I claim:

1. A master cylinder having a first pressure chamber and a second pressure chamber,
   said first chamber having a cylindrical bore,
   said second chamber including a relatively larger diameter cylindrical bore,
   a first piston slidably received within said first chamber bore,
   said first and second pistons defining the axial length of said second chamber,
   one of said pistons being formed with an axially extending stem portion,
   the other of said pistons being formed with an axial recess receiving said stem portion,
   spring means positioned along said stem portion and caged within said axial recess,
   said spring means biasing said first and second pistons into an axially normal relative position,
   said first piston being movable relative to said second piston to increase and decrease the axial length of said second chamber,
   a first pair of abutment means on said stem portion confining said spring means therebetween,
   a second pair of abutment means within said recess confining said spring means therebetween.

2. A master cylinder according to claim 1 and including:
   said stem portion being of lesser axial length than said recess to permit said second piston to move relatively toward said first piston from the normal relative position.

3. A master cylinder according to claim 1 and including:
   the axial lengths between said first pair of abutment means and said second pair of abutment means being substantially equal.

4. A master cylinder according to claim 1 and including:
   washer means positioned within said recess and about said stem portion contacting the axial extreme portions of said spring means.

5. A master cylinder according to claim 1 and including:
   a pair of cup-shaped washer means positioned within said recess and about said stem portion receiving the end portions, respectively, of said spring means.

6. A master cylinder according to claim 2 and including:
   the axial lengths between said first pair of abutment means and said second pair of abutment means being substantially equal,
   a pair of cup-shaped washer means positioned within said recess and about said received portion receiving the end portions, respectively, of said spring means,
   the combined axial length of said pair of cup-shaped washers being less than axial length between one of said pairs of abutments.

7. A master cylinder according to claim 1 and including:
   said first compression chamber defined in part by an end portion having an orifice,
   a fluid reservoir,
   said orifice communicating with said reservoir,
   a valve means adjacent said orifice closing said orifice upon actuation of said first piston.

8. A master cylinder according to claim 7 and including:
   said stem portion being of lesser axial length than said recess to permit said second piston to move relative toward said first piston from the normal relative position.

9. A master cylinder according to claim 1 and including:
   said spring means comprising a coil spring positioned substantially concentrically about said stem portion.

References Cited

UNITED STATES PATENTS 3,147,596  9/1964  Wallace.
3,292,371  12/1966  Belart.
3,296,798  1/1967  Shutt.
3,332,240  7/1967  Rise.

FOREIGN PATENTS 977,268  12/1964  Great Britain.

MARTIN P. SCHWADRON, Primary Examiner
ROBERT R. BUNEVICH, Assistant Examiner

U.S. Cl. X.R.
188—152